US011038838B2

(12) United States Patent
Lau et al.

(10) Patent No.: US 11,038,838 B2
(45) Date of Patent: Jun. 15, 2021

(54) PRIORITIZING COMMUNICATION WITH NON NETWORK-ENABLED INTERNET OF THINGS DEVICES

(71) Applicants: AT&T INTELLECTUAL PROPERTY I, L.P., Atlanta, GA (US); AT&T Mobility II LLC, Atlanta, GA (US)

(72) Inventors: Erie Lai Har Lau, Redmond, WA (US); Zhi Cui, Sugar Hill, GA (US); Sangar Dowlatkhah, Alpharetta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 159 days.

(21) Appl. No.: 16/010,339

(22) Filed: Jun. 15, 2018

(65) Prior Publication Data

US 2019/0386954 A1 Dec. 19, 2019

(51) Int. Cl.
*H04L 29/12* (2006.01)
*H04W 12/06* (2021.01)
*H04W 80/04* (2009.01)

(52) U.S. Cl.
CPC ...... *H04L 61/2503* (2013.01); *H04L 61/2007* (2013.01); *H04W 12/06* (2013.01); *H04W 80/04* (2013.01)

(58) Field of Classification Search
None
See application file for complete search history.

(56) References Cited

U.S. PATENT DOCUMENTS

| 7,738,488 B2 | 6/2010 | Marsico et al. |
| 7,990,985 B2 | 8/2011 | Chen |

(Continued)

FOREIGN PATENT DOCUMENTS

| KR | 20090019473 A | 2/2009 |
| KR | 101740456 B1 | 5/2017 |

(Continued)

OTHER PUBLICATIONS

Zhang, et al. "Home M2M networks: architectures, standards, and QoS improvement" IEEE Communications Magazine 49.4 (2011). 9 pages.

(Continued)

*Primary Examiner* — Saba Tsegaye
(74) *Attorney, Agent, or Firm* — Amin, Turocy & Watson, LLP

(57) ABSTRACT

An integrated GW (I-GW) can be utilized to facilitate communications with Internet of things (IoT) devices that operate without Internet protocol (IP) addresses, based on assigned preferences and/or priority. In one aspect, the I-GW can efficiently deliver existing services for various types of IoT devices (e.g., that support different non-IP protocols) and can create emerging applications across different vertical applications. Further, the I-GW can leverage mobility network elements to authenticate, prioritize connections, and/or enable data orchestration via underlying software defined network (SDN)-enabled capabilities and/or infrastructure services. By utilizing IoT devices that do not have IP stacks, a cost and/or size of the IoT devices can be decreased and battery life can be significantly extended.

20 Claims, 11 Drawing Sheets

(56) References Cited

U.S. PATENT DOCUMENTS

| | | |
|---|---|---|
| 8,121,109 B2 | 2/2012 | Sibileau |
| 8,627,420 B2 | 1/2014 | Furlan et al. |
| 9,775,562 B2 | 10/2017 | Egner et al. |
| 9,780,823 B2 | 10/2017 | Egner et al. |
| 9,848,279 B2 | 12/2017 | Cui et al. |
| 2003/0056012 A1 | 3/2003 | Modeste et al. |
| 2013/0094444 A1 | 4/2013 | Lai et al. |
| 2013/0346108 A1 | 12/2013 | Kamen et al. |
| 2015/0281122 A1 | 10/2015 | Hoffman et al. |
| 2015/0349975 A1 | 12/2015 | Hu et al. |
| 2016/0165663 A1 | 6/2016 | Shanmugam et al. |
| 2017/0048308 A1 | 2/2017 | Qaisar |
| 2017/0149614 A1* | 5/2017 | Zheng ............... H04L 41/12 |
| 2017/0155744 A1 | 6/2017 | Lee et al. |
| 2017/0251393 A1 | 8/2017 | Cui et al. |
| 2017/0347283 A1 | 11/2017 | Kodaypak |
| 2017/0353859 A1 | 12/2017 | Idnani et al. |
| 2017/0374490 A1* | 12/2017 | Schoppmeier ...... H04L 67/12 |
| 2018/0041856 A1 | 2/2018 | Lou et al. |
| 2018/0115539 A1* | 4/2018 | Muhanna ........... H04L 63/061 |
| 2018/0198641 A1* | 7/2018 | Gilani ............. H04L 41/0668 |
| 2019/0089747 A1* | 3/2019 | Wang ............... H04L 63/205 |
| 2019/0190782 A1* | 6/2019 | Panje ................. H04L 41/12 |

FOREIGN PATENT DOCUMENTS

| | | |
|---|---|---|
| WO | 2011030967 A1 | 3/2011 |
| WO | 2011127706 A1 | 10/2011 |
| WO | 2011153737 A1 | 12/2011 |
| WO | 2012083825 A1 | 6/2012 |
| WO | 2012083826 A1 | 6/2012 |
| WO | 2017203228 A1 | 11/2017 |

OTHER PUBLICATIONS

Aazam, et al. "Fog computing and smart gateway based communication for cloud of things" Future Internet of Things and Cloud (FiCloud), 2014 International Conference, IEEE, 2014. 7 pages.

Borgia, Eleonora. "The Internet of Things vision: Key features, applications and open issues" Computer Communications 54 (2014): 1-31.

Zhu, et al. "IOT gateway: Bridging wireless sensor networks into internet of things" Embedded and Ubiquitous Computing (EUC), 2010 IEEE/IFIP 8th International Conference, IEEE, 2010. 6 pages.

Ding, et al. "A smart gateway architecture for improving efficiency of home network applications" Journal of Sensors 2016 (2016). 11 pages.

* cited by examiner

PRIORITIZING COMMUNICATION WITH NON NETWORK-ENABLED INTERNET OF THINGS DEVICES

TECHNICAL FIELD

The subject disclosure relates to wireless communications, e.g., a system and method that prioritizes communication with non network-enabled Internet of Things (IoT) devices.

BACKGROUND

Wireless communications and electronic end devices have been growing at a very fast pace. In addition, the variation of different types of end device is also rapidly increasing. For example, the different types of non-traditional end devices, such as monitoring machine to machine (M2M) and/or Internet of things (IoT) devices continue to grow. M2M/IoT hold a great promise for the future of a global communications industry. With projections anywhere from twenty billion to a hundred billion connected things (e.g., machines) by the year 2020, the IoT affects various industries, organizations, companies, and service providers that create the IoT devices, network infrastructure solutions, and end users. Delivering a successful and cost-effective consumer as well as enterprise IoT solutions with a complex connectivity model can pose several challenges.

Conventional IoT devices include an internet protocol (IP) stack for communication with their respective application servers. However, the inclusion of the IP stack within the IoT devices can significantly increase device costs and/or size, as well as increase battery consumption and processing power.

DETAILED DESCRIPTION

Figure 1:
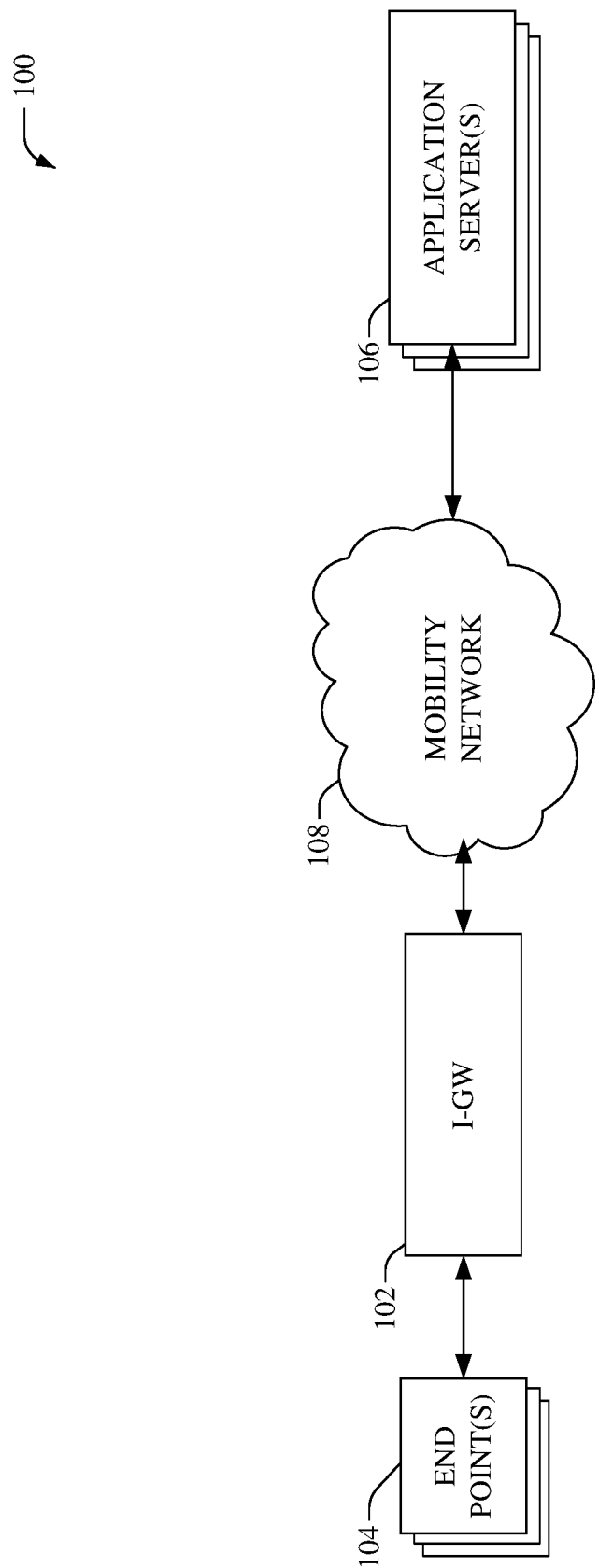
FIG. 1 illustrates an example system that facilitates communication with Internet of Things (IoT) devices that operate without Internet protocol (IP) addresses.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

The Internet of Things (IoT) is a network of physical devices, vehicles, home appliances, and other items embedded with electronics, software, sensors, actuators, and connectivity, which enables these devices to connect and exchange data. In recent years, there has been an explosive growth in the different types of IoT devices (e.g., devices that employ different communication protocols). Oftentimes, each type of the IoT devices can have their own gateway that can enable a single/individual vertical service/application (e.g., such as temperature monitors and controller, home security, smart light switches, etc.).

The systems and methods disclosed herein, in one or more non-limiting embodiments, enable simple end devices that operate without Internet protocol (IP) addresses, to communicate, based on preferences and/or priority, with an external device (e.g., outside of a home and/or enterprise) by employing an integrated gateway (I-GW) that supports various types of protocols. In one aspect, the I-GW facilitates an efficient delivery of existing services for various types of end devices (e.g., that do not have IP addresses) and creation of emerging applications across different vertical applications. Further, the I-GW can leverage existing mobility network elements to perform authentication, prioritize connections, and/or enable data orchestration via underlying software defined network (SDN)-enabled capabilities and/or infrastructure services. By utilizing IoT devices that do not have IP stacks, a cost and/or size of the IoT devices can be decreased and battery life can be extended.

Referring initially to FIG. 1, there illustrated is an example system 100 that facilitates communication with IoT devices that operate without IP addresses, according to one or more aspects of the disclosed subject matter. In one aspect, an integrated gateway (I-GW) 102 can be utilized to efficiently deliver existing services for various types of end point(s) 104 that do not have IP addresses and to create emerging applications across multiple vertical services. As an example, end point(s) 104 can comprise M2M and/or IoT devices such as, but not limited to, most any LTE-based appliance, machine, device, security system, home automation system, automated vehicle and/or at least partially automated vehicle (e.g., drones), etc. Further, M2M and/or IoT devices can comprise one or more sensors and/or a radio-frequency identification (RFID) reader, and are typically employed for automated data transmission and/or measurement between mechanical and/or electronic devices. It is noted that the end point(s) 104 can be mobile, have limited mobility and/or be stationary. In one example, the end point(s) 104 can be deployed within a customer premises (e.g., a home, enterprise, office, store, factory, etc.). Typically, the end point(s) 104 and the I-GW 102 can be commonly owned by a user (and/or be associated with a common user account).

Typically, the end point(s) 104 can have different characteristics than regular user equipments (UEs) (e.g., non-M2M/IoT devices, such as smart phones, tablet computers, personal computers, etc.). For example, regular UEs are generally are always on and performing multiple applications at any given time. Thus, regular UEs need always-on connectivity with a network. However, the network connectivity and/or communication characteristics of IoT devices vary based on applications and/or industry. Generally, in one aspect, a large portion of IoT devices is not continuously on. For example, a connected-utility meter is not coupled to the network and/or communicating with the network all day; however, a connected-medical device (e.g., a magnetic resonance imaging (MRI) scanner, X-ray machine, and/or a critical medical diagnostic equipment connected to a patient) can be continuously on (e.g., frequently communicating via the network). In another aspect, the same IoT device may change its communication/connectivity characteristics at different times and/or locations. For example, connected cars can be intermittently on, depending on whether the driver is in the car or the car is parked in a lot. Moreover, IoT devices have non-uniform and oftentimes unpredictable traffic patterns.

The battery life of the IoT devices for transmitting and processing data is a very important factor in implementation of IoT devices for a range of applications. To extend battery life and reduce costs (and/or size, complexity, etc.), the end point(s) 104 can exclude an IP stack. As an example, end point(s) 104 can communicate via various other protocols (e.g., Zigbee, Wi-Fi, Bluetooth, serial ports (for example, RS-232), Ethernet, message queuing telemetry transport (MQTT), etc.) that utilize non-IP addressing schemes, such as, but not limited to, 64-bit IEEE addresses, media access control (MAC) type non-IP addresses, abbreviated type non-IP addresses, etc.

According to an aspect, the end point(s) 104 and their respective application servers 106 (e.g., a third-party application server of a service provider and/or device manufacturer) can communicate with each other via the I-GW 102. As an example, the I-GW 102 can download (e.g., dynamically) the protocols utilized by the end point(s) 104 to enable the communication between the application servers 106 and the end point(s) 104. Further, in an aspect, the I-GW 102 can leverage a mobility network 108 for authentication, prioritization, and/or data orchestration, for example, by employing underlying SDN-enabled capabilities and infrastructure services of the mobility network 108 (e.g., cellular network).

Furthermore, in another aspect, the I-GW 102 can enable additional emerging applications across many vertical applications, for example, based on subscriber preferences and/or policies, manufacturer preferences and/or policies, service provider preferences and/or policies, etc. For example, the I-GW 102 can facilitate creation of a personal in-home experience by adjusting the light and/or temperature to a first setting when a subscriber is determined to be watching the Super bowl and a second setting when the subscriber is determined to be sleeping.

As an example, the I-GW 102 can be deployed at a customer's premises (e.g., a home, office, enterprise, warehouse, hotel, store, factory, automation plant, connected vehicle, etc.) and can comprise a subscriber identity module (SIM) and/or soft SIM to facilitate authentication and communicate with the mobility network 108. In one aspect, utilization of the I-GW 102 can allow utilization of end point(s) 104 that operate without an IP stack to extend battery life. Further, the I-GW 102 can provide efficient connectivity of end point(s) 104 in the network across several industry verticals leading to new business models and/or emerging applications that were not possible with conventional systems.

Figure 2:
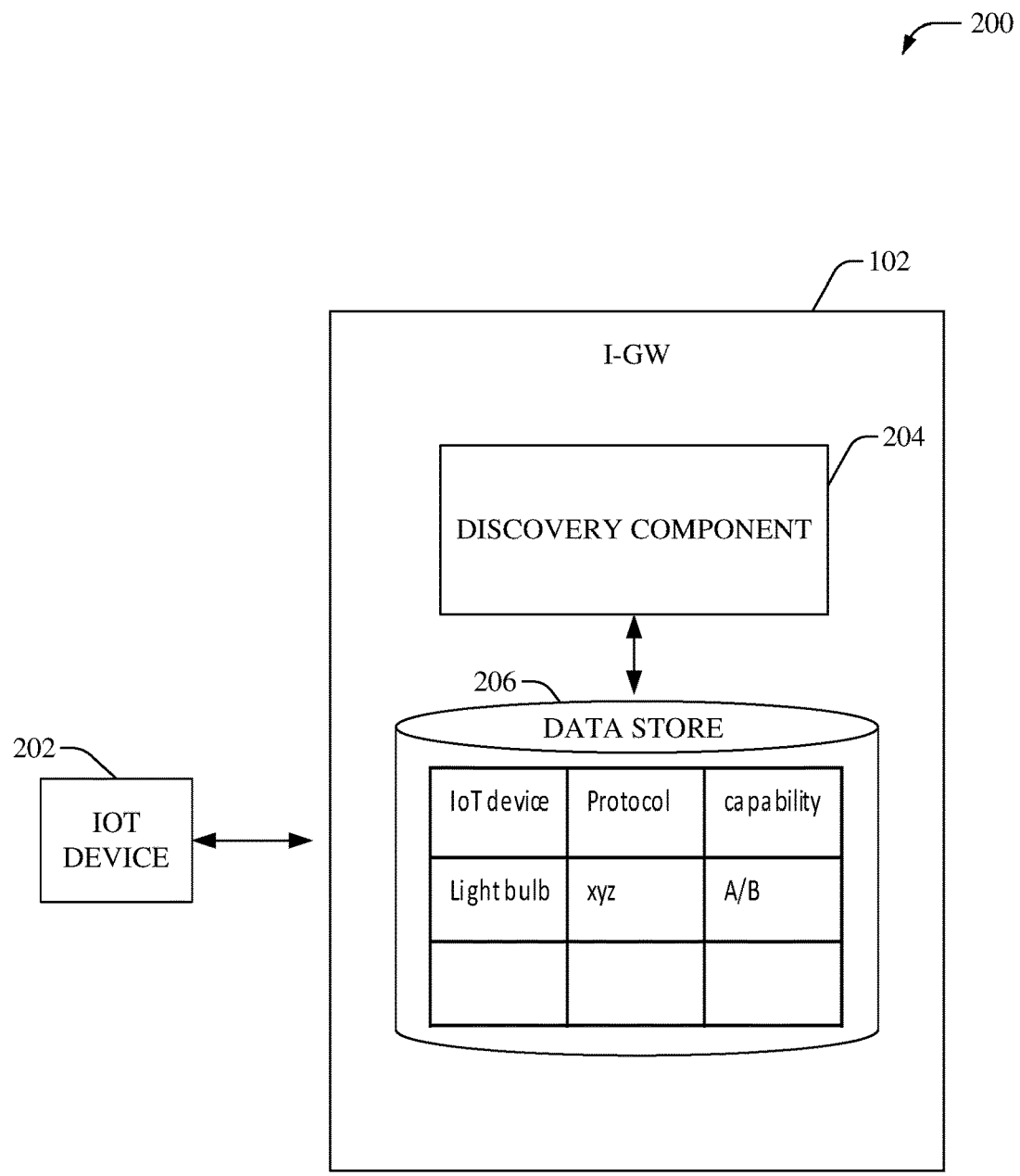
FIG. 2 illustrates an example system for end point discovery, in accordance with an aspect of the subject disclosure.

Referring now to FIG. 2, there illustrated is an example system 200 for end point discovery, in accordance with an aspect of the subject disclosure. It is noted that the I-GW 102 can comprise functionality as more fully described herein, for example, as described above with regard to system 100. Further, IoT device 202 can be substantially similar to end point(s) 104 and can comprise functionality as more fully described herein, for example, as described above with regard to end point(s) 104.

Initially, when a new device, for example, IoT device 202 is provisioned, activated, and/or powered on, a discovery component 204 can be utilized to auto-detect a protocol (e.g., a non-IP protocol) that the IoT device 202 is running and optionally, one or more capabilities and/or functions of the IoT device 202. Additionally, or alternatively, the I-GW 102 can initiate the end point discovery process (e.g., via discovery component 204), for example, during provisioning, initial setup, periodically, in response to an event, on-demand, etc. As an example, the IoT device 202 can comprise one or more sensing capabilities (e.g., camera, temperature sensor, humidity sensor, motion sensor, etc.) and/or control functions (e.g., controlling valves, switches, other devices, etc.). The protocol and/or capability information for each IoT device (e.g., IoT device 202) coupled to the I-GW 102 can be stored within a data store 206. In one aspect, a user can trigger the I-GW 102 to add the capabilities and/or functions as a value-added service (VAS).

According to an embodiment, the I-GW 102 can comprise a protocol layer, a translation layer, and an IP layer. For a newly detected IoT device (e.g., IoT device 202), the I-GW 102 can update the protocol layer with the new protocol supported by the new IoT device. Moreover, the I-GW 102 can download the protocol from the device manufacturer's and/or service provider's website (e.g., via communication with the web server over the mobility network 108). The protocol can then be utilized to facilitate communication between the I-GW 102 and the IoT device 202. As an example, the protocol can be stored within a protocol library, for example, within the data store 206. It is noted that the data store 206 can comprise volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to include, without being limited to, these and any other suitable types of memory.

Figure 3:
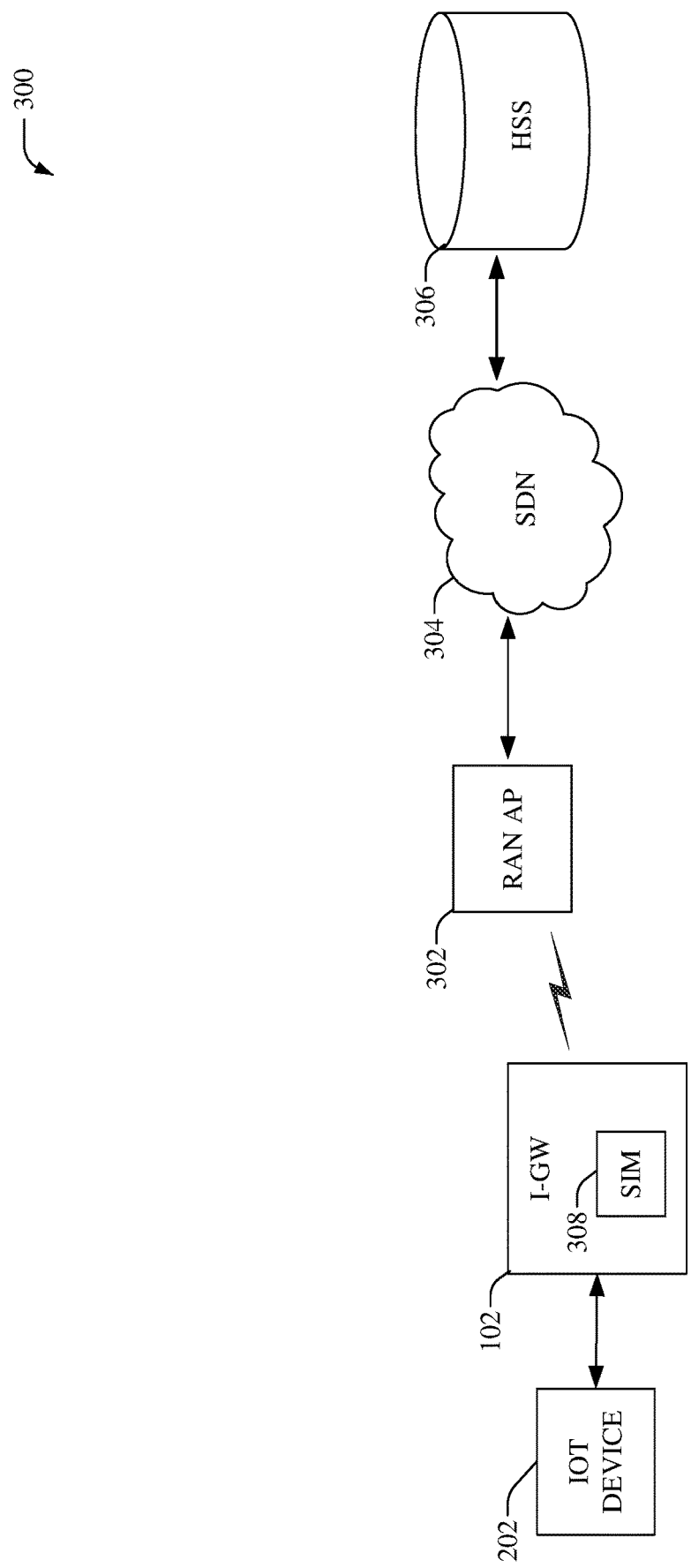
FIG. 3 illustrates an example system that facilitates network-based authentication of end point devices that do not utilize an IP address.

Referring now to FIG. 3, there illustrated is an example system 300 that facilitates network-based authentication of end point devices that do not utilize an IP address, in accordance with an aspect of the subject disclosure. It is noted that the I-GW 102 and IoT device 202 can comprise functionality as more fully described herein, for example, as described above with regard to systems 100 and 200.

Subsequent to a discovery (and/or negotiation) process that is utilized by the I-GW 102 to detect the IoT device 202, the I-GW 102 can message (e.g., wirelessly) an access point (AP) 302 (e.g., eNodeB (eNB), home nodeB (HNB), etc.) of a radio access network (e.g., of mobility network 108). For example, an attach message can be transmitted by the I-GW 102 to couple to the RAN AP 302. Moreover, the RAN AP 302 can forward the message to a SDN controller (not shown) of a SDN 304 within the mobile network. The SDN controller can forward the attach message to a network data store, for example, a home subscriber server (HSS) 306 for authentication. According to an aspect, data (e.g., international mobile subscriber identity (IMSI), authentication triplets, etc.) from the SIM 308 of the I-GW 102 can be utilized to facilitate the authentication and secure the I-GW 102. Additionally, or optionally, on successful authentication, the HSS 306 can provide, to the I-GW 102, a preconfigured user profile that comprises preferences and/or policies defined by a user of the I-GW 102. Further, in one aspect, the HSS 306 can also provide an additional security key to improve the security level and provide priority status data (e.g., standard priority or preferred priority) prioritization for the IoT communication. Moreover, the I-GW 102 can utilize the received information received from the HSS 306 to facilitate IoT communication between the IoT device 202 and an application server (e.g., application server(s) 106) and/or facilitate implementation of value-added and/or managed services.

According to an embodiment, the architecture disclosed in system 300 can facilitate application of network functions virtualization (NFV) and/or SDN technologies. NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

In one example, the mobility network in system 300 can comprise 5G and/or other next generation networks that provide enhanced mobile broadband, for example, ultra high bandwidth (e.g., 20 Gbps), high spectral efficiency (e.g., 3.5× of LTE), ultra dense networks, and/or energy efficiency. Further, the 5G networks can provide ultra-reliable (e.g., high reliability greater than 99.999%) and low latency communications (e.g., ultra low latency of −1 msec and/or low network access and synchronization time). Furthermore, the 5G networks can facilitate massive machine type communication (e.g., ultra high density (10⁶/sq km), long battery life (10 years+), high system gain (better than narrow band-IoT and/or more efficient than narrow band-IoT).

Figure 4:
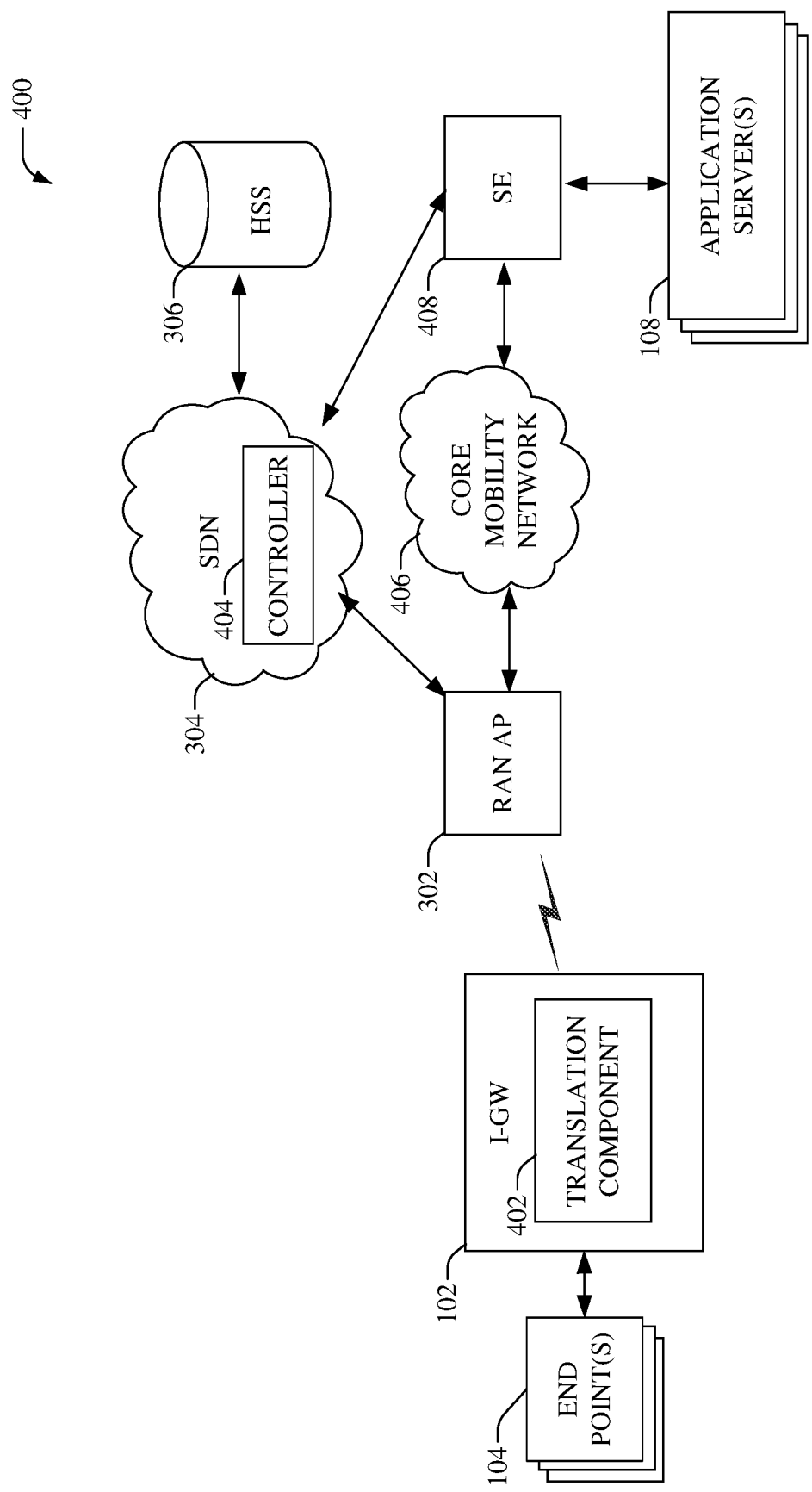
FIG. 4 illustrates an example system that leverages a software-defined network (SDN) controller to facilitate communication with IoT devices that do not support IP addressing.

Referring now to FIG. 4, there illustrated is an example system 400 that leverages a SDN controller to facilitate communication with IoT devices that do not support IP addressing, according to an aspect of the subject disclosure. It is noted that the I-GW 102, end point(s) 104, application server(s) 108, AP 302, SDN 304, and HSS 306, can comprise functionality as more fully described herein, for example, as described above with regard to systems 100-300. Although system 400 has been described with respect to a 5G network, it is noted that the subject disclosure is not limited to 5G networks and can utilize most any mobility network.

Once the I-GW 102 has been authenticated by the HSS 306, the I-GW 102 can facilitate IoT communication. For example, a translation component 402 can be utilized to map non-IP packets received from the end point(s) 104 to IP packets that are to be transmitted to the application server(s) 108 (and/or vice versa) via the mobility network. In one aspect, the translation component 402 can utilize an IP address pool allocated to the I-GW 102 by a network device (e.g., the SDN controller 404) of the mobility network. It is noted that the I-GW 102 is not limited to mapping between non-IP packets and IP packets, and the translation component 402 can be utilized to map text messaging (e.g., a command for switching a light switch on/off), received from a messaging server (not shown) of the mobility network, to the non-IP packets transmitted to the end point(s) 104. As an example, a user can send a text message (e.g., short messaging service (SMS), instant message, multimedia messaging service (MMS), etc.) to a phone number associated with the SIM of the I-GW 102. Typically, the text message can comprise instructions to control the end point(s) 104 and/or to request status updates from the end point(s) 104. Optionally, a native identifier (ID) and/or port number associated with the end point(s) 104 can be embedded in the IP header extension field and/or in the text message. In one aspect, the I-GW 102 can then utilize the native ID and/or port number to deliver the data/packets to the target end point.

Typically, when an IP message is sent to a destination, it includes a source IP address and destination IP address. However, in the above scenario, messages directed to the end point(s) 104 are addressed to the IP address of the I-GW 102. On receiving the messages, the translation component 402 can analyze the message to determine the destination IoT device (e.g., end point(s) 104), transform (e.g., reassembles) the message to adhere to a protocol supported by the IoT device, and convey the transformed message to the IoT device. If the I-GW 102 receives a response from the IoT device, the translation component 402 can transform the response back to adhere to the IP protocol and transfer it to the sender.

In an aspect, local communication can be performed by the I-GW 102 to facilitate communication between two or more of the end points 104 without directing data to the mobility network. Moreover, once the end points 104 have registered with the I-GW 102 (e.g., during an auto-discovery process), the I-GW 102 is aware of capabilities and/or service levels for the end points and can adhere to those policies during the communication. As an example, if the end points 104 support different protocols, the translation component 402 can facilitate mapping between the protocols to facilitate the communication. It is noted that in some example scenarios, if service levels are increased (e.g., value-added service), at least a portion of the communication can be routed via the mobility network. For example, the end point 104 can comprise a door sensor that can be used to sense if door is open or closed (e.g., as its core/basic service). If determined that the door sensor has additional capabilities, for example, a temperature and/or humidity sensor, a user can trigger the I-GW 102 to add the temperature and/or humidity sensing as a value-added service. Additionally, or optionally, the user can employ the service provider's website to have the value-added service pushed to the I-GW 102. It is noted that the subject disclosure is not limited to value-added services and that different service levels (e.g., basic service level, enhanced level and managed service level) can be implemented.

In one embodiment, the service providers can be provided with an application programming interface (API) that can be utilized to communicate with their devices (e.g., push a firmware update). The communication is routed through the I-GW 102, which can have its own security and/or policies to allow or deny the communication.

In one aspect, a SDN controller 404 can provide a routing function within the service delivery network between the service delivery entry/exit point (e.g., eNB), for example, by employing end point network IP address, and can configure the forwarding elements (e.g., elements within the core mobility network 406, service enabler (SE) 408 that is utilized for third-party service, etc.) of the service delivery network. The SDN controller 404 can determine the services that are available to a user and a service level agreement (SLA) with user, and based on the determined information can dynamically control (increase or decrease) the service level based on user preferences (e.g., stored within the HSS 306). As an example, for a camera of a security system installed within a house, the user preference can specify that an enhanced service (e.g., upload every recorded frame to a cloud device) be employed when the user is not within the house and a basic service (e.g., upload recorded frames only when motion is detected) be employed when the user is within the house. Moreover, the SDN controller 404 can implement these preferences by controlling the entities such as, but not limited to, repositories, backhaul transport, etc., of the mobility network. Basically, system 400 enables service providers and/or user to communicate with the end point(s) 104 as though they were operating a full processing/stack capability.

Figure 5:
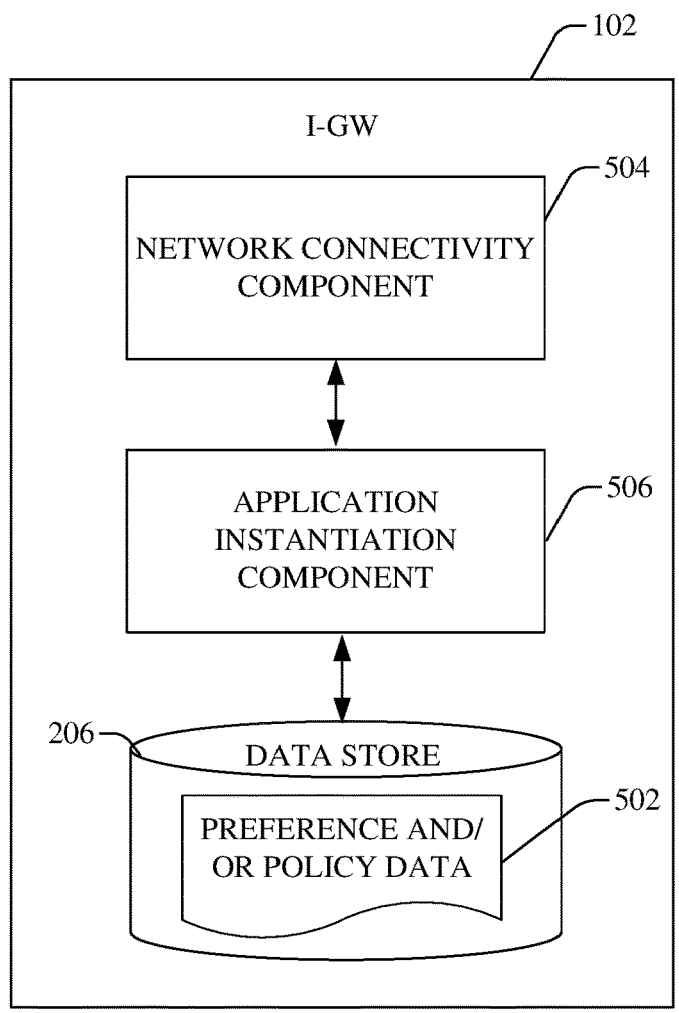
FIG. 5 illustrates an example system that comprises a situation-aware gateway for implementing IoT services.

FIG. 5 illustrated an example system 500 that comprises a situation-aware gateway for implementing IoT services, according to an aspect of the subject disclosure. It is noted that the I-GW 102 and the data store 206 can comprise functionality as more fully described herein, for example, as described above with regard to systems 100-400. Moreover, the I-GW can have added intelligence to implement IoT services and/or applications that adhere to preference and/or policy data 502, for example, defined by a user, service provider, IoT device manufacturer, mobility network operator, etc.

In one aspect, a network connectivity component 504 can monitor a connection between the I-GW 102 and a mobility network (e.g., via RAN AP 302). If the network connectivity component 504 determines that the connection satisfies a defined criterion, for example, the I-GW 102 is currently connected to the RAN AP and/or the connection speed, bandwidth, throughput, signal strength, etc. is above a defined threshold, etc., then the I-GW 102 can typically, receive triggers and/or instructions from the user and/or application server(s) 108 for facilitating IoT application and/or services with the end point(s) 104. Alternatively, if the network connectivity component 504 determines that the connection does not satisfies the defined criterion, for example, the I-GW 102 has lost connection to the RAN AP and/or the connection speed, bandwidth, throughput, signal strength, etc. is above a defined threshold, etc., then application instantiation component 506 can instantiate a situation-aware IoT application/service that is defined by the preference and/or policy data 502. For example, for an I-GW 102 that is deployed within a remote area, such as an oil rig, the I-GW 102 can instantiate a new situation-aware application within the gateway to complement the network provided information in response to determining that a backhaul link is lost (e.g., due to extreme weather). In this example scenario, the application/service can be a fire-aware application/service that closes specified valves when a fire is detected. Moreover, once network connectivity is resumed, the application/service can be canceled and default gateway functions can be resumed (e.g., wherein the service provider controls situation-aware applications/services)

Figure 6:
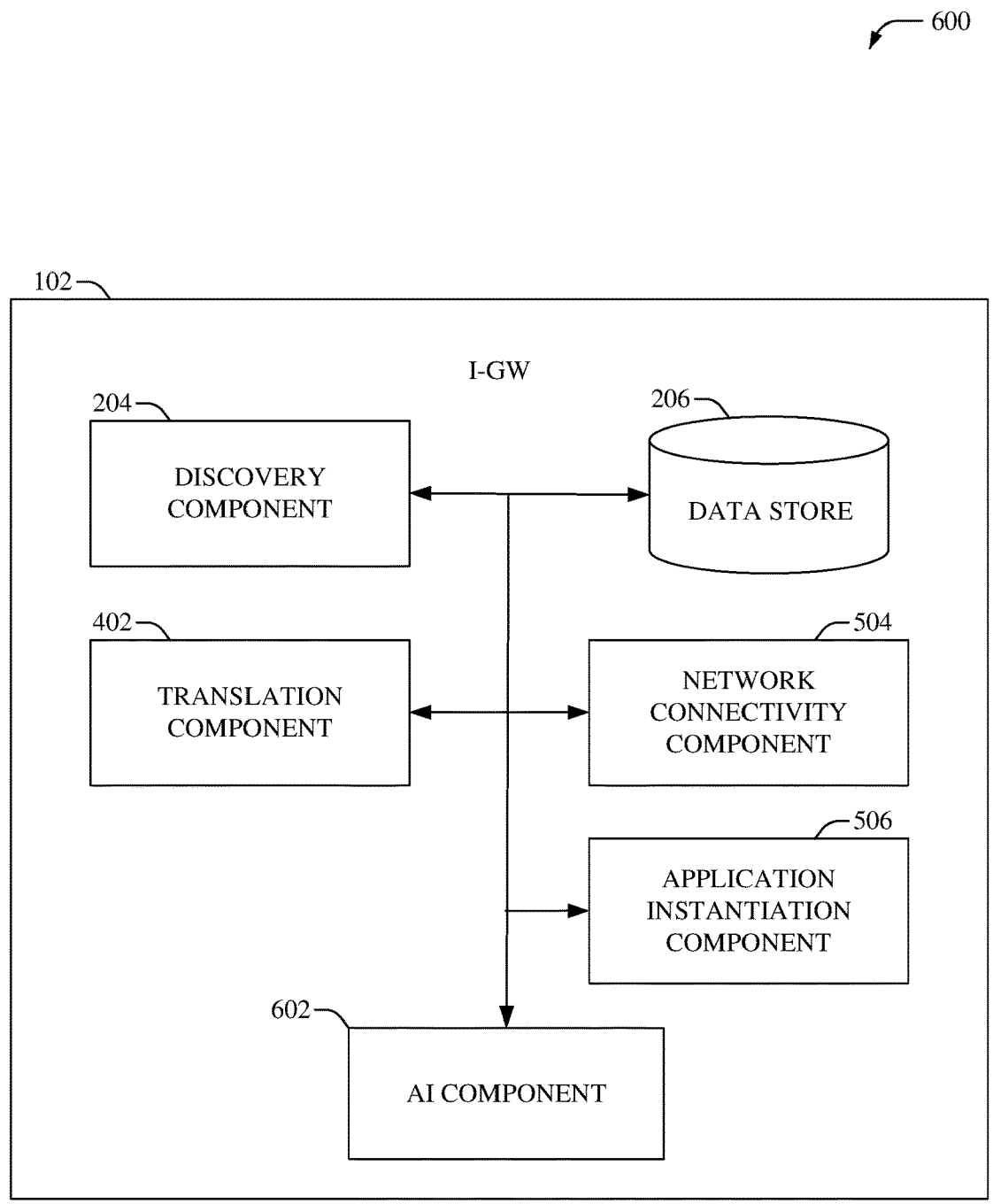
FIG. 6 illustrates an example system that facilitate automating one or more features in accordance with the subject embodiments.

Referring now to FIG. 6, there illustrated is an example system 600 that employs an artificial intelligence (AI) component 602 to facilitate automating one or more features in accordance with the subject embodiments. It can be noted that the I-GW 102, discovery component 204, data store 206, translation component 402, network connectivity component 504, and application instantiation component 506 can comprise functionality as more fully described herein, for example, as described above with regard to systems 100-500. Although, the AI component 602 is depicted to reside within the I-GW 102, it is noted that the subject disclosure is not that limited and that at least a portion the AI component 602 can be locally and/or remotely coupled to the I-GW 102.

In an example embodiment, system 600 (e.g., in connection with controlling service levels) can employ various AI-based schemes (e.g., intelligent processing/analysis, machine learning, etc.) for carrying out various aspects thereof. For example, a process for determining service attributes, user preferences, which services/application to instantiate, and/or update, whether to increase or decrease a service level, etc. can be facilitated via an automatic classifier system implemented by the AI component 602. Moreover, the AI component 602 can exploit various AI methods and/or machine learning methods. Artificial intelligence techniques can typically apply advanced mechanisms—e.g., decision trees, neural networks, regression analysis, principal component analysis (PCA) for feature and pattern extraction, cluster analysis, genetic algorithm, or reinforced learning—to a data set. In particular, the AI component 602 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to one or more predetermined criteria, service type and attributes, an optimized service level, a time period during which the application/service is to be executed, etc. The criteria can comprise, but is not limited to, historical patterns and/or trends, user and/or network operator preferences and/or policies, application/service provider preferences, predicted traffic flows, event data, latency data, reliability/availability data, current time/date, location data, performance and/or load data, and the like.

Figure 7:
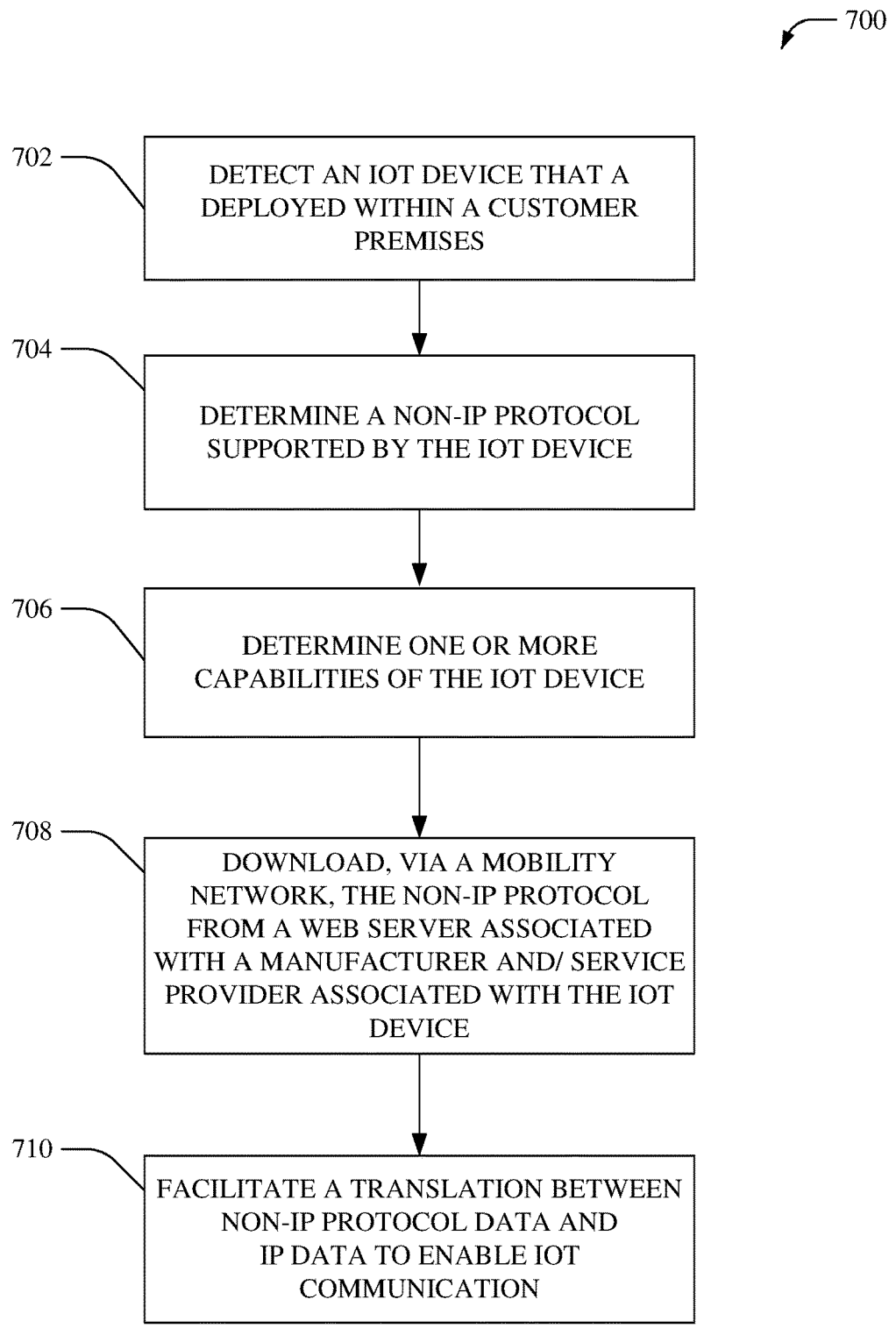
FIG. 7 illustrates an example method that facilitates auto-detection of end point protocols.
Figure 8:
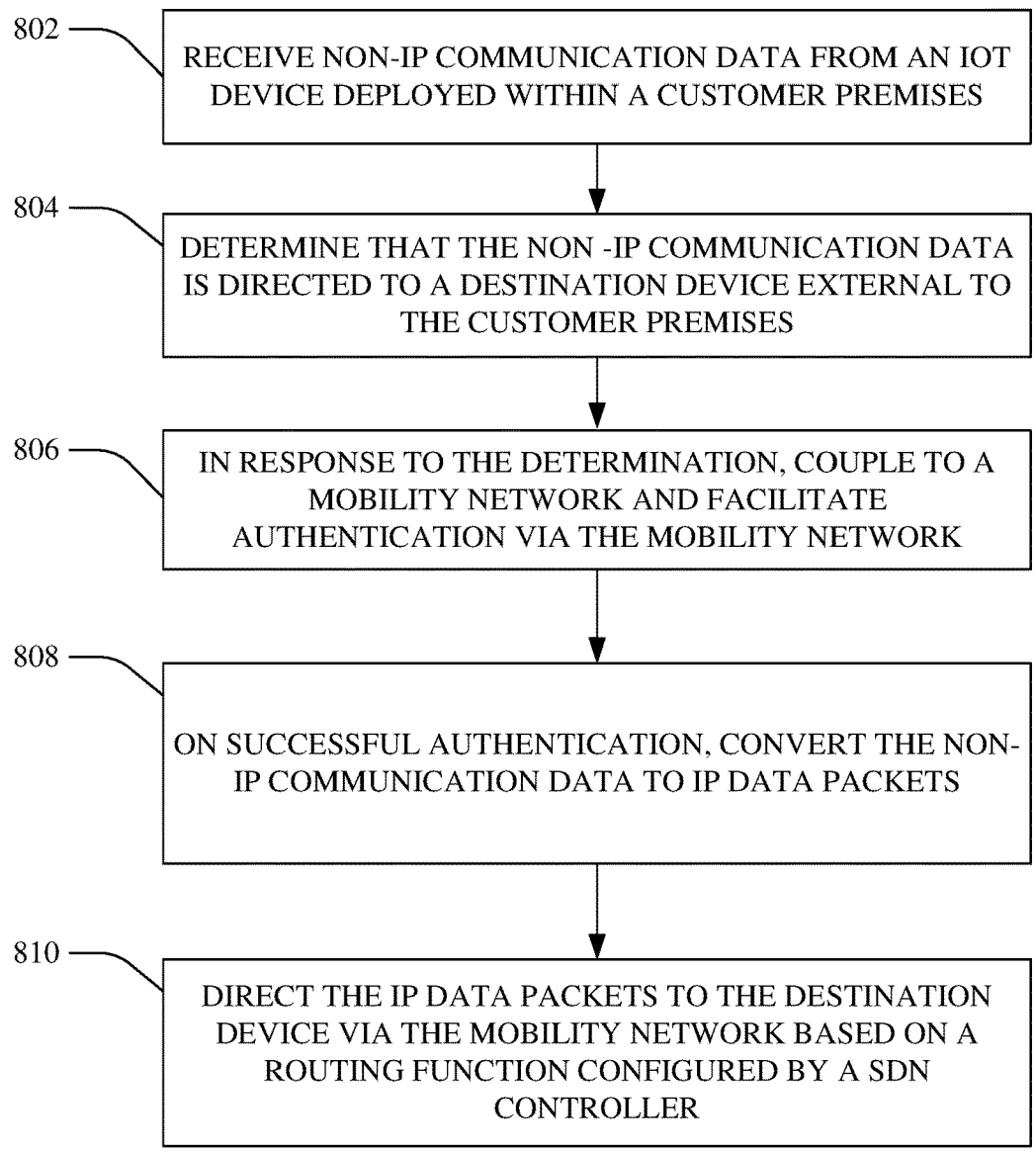
FIG. 8 illustrates an example method that facilitates communication with IoT devices that do not operate using IP addresses.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates auto-detection of end point protocols, according to an aspect of the subject disclosure. As an example, method 700 can be implemented by a gateway device (e.g., I-GW 102) of a deployed within a customer premises. At 702, an IoT device that is deployed within the customer premises (and/or that is associated with a user account) can be detected (e.g., by employing an auto-detection and/or auto-negotiation process). It is noted that the IoT device does not comprise an IP stack. At 704, a non-IP protocol supported by the IoT device can be determined. As an example, the non-IP protocol can comprise, but is not limited to, a Zigbee protocol, a Bluetooth protocol, a MQTT protocol, etc. Further, at 706, one or more capabilities (and/or functions) of the IoT devices can be determined. As an example, a record comprising the supported protocols and/or capabilities can be generated for the IoT and stored within the gateway device.

At 708, the non-IP protocol can be downloaded from a web server associated with a manufacturer and/or service provider associated with the IoT device, for example, via a mobility network. Further, at 710, a translation of non-IP protocol data and IP data can be facilitated to enable IoT communication to/from the IoT device.

FIG. 8 illustrates an example method 800 that facilitates communication with IoT devices that do not operate using IP addresses, according to an aspect of the subject disclosure. As an example, method 800 can be implemented by a gateway device (e.g., I-GW 102) that is deployed within a customer premises and that comprises a SIM card that is utilized for accessing a mobility network. At 802, non-IP communication data can be received from an IoT device deployed with the customer premises. At 804, it can be determined that the non-IP communication data is directed to a destination device that is external to customer premises. In response to the determination, the gateway device can couple to the mobility network and facilitate authentication via the mobility network (e.g., by employing the information stored within the SIM card).

At 808, on successful authentication, the non-IP communication data can be converted to IP data packets. As an example, an IP address pool allocated to the gateway device by a network device (e.g., SDN controller) of the mobility network can be utilized for the conversion. It is noted that the subject disclosure is not limited to converting the non-IP communication data to IP data packets, and the non-IP communication data can be converted to a text message (e.g., SMS, MMS, instant message, etc.) that can be sent to a text messaging server. Further, at 810, the IP data packets can be directed to the destination device via the mobility network, based on a routing function configured by the SDN controller.

Figure 9:
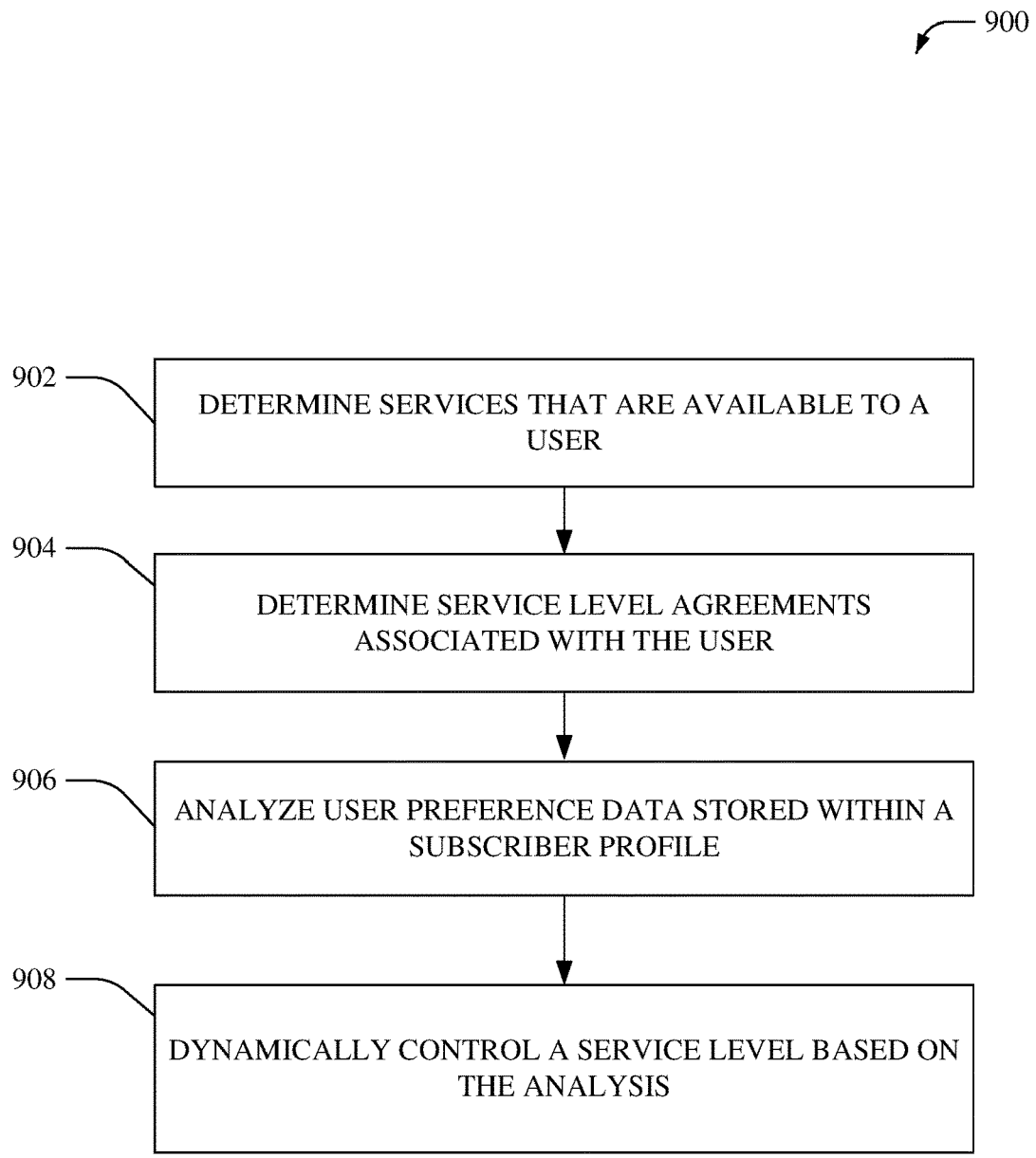
FIG. 9 illustrates an example method that facilitates creation of emerging applications across different vertical applications.

FIG. 9 illustrates an example method 900 that facilitates creation of emerging applications across different vertical applications, according to an aspect of the subject disclosure. As an example, method 900 can be implemented by one or more network devices of a communication network (e.g., cellular network). At 902, one or more services that are available to a user can be determined. At 904, a SLA associated with the user can be determined. Further, at 906, user preference data, stored within a subscriber profile (e.g., stored within the HSS), can be analyzed. Furthermore, at 908 a service level can be dynamically controlled based on the analysis. For example, a basic service level, an enhanced service level (e.g., value-added service level), or a managed service level can be selected. Based on the dynamic selection, emerging applications across many vertical applications can be instantiated.

Figure 10:
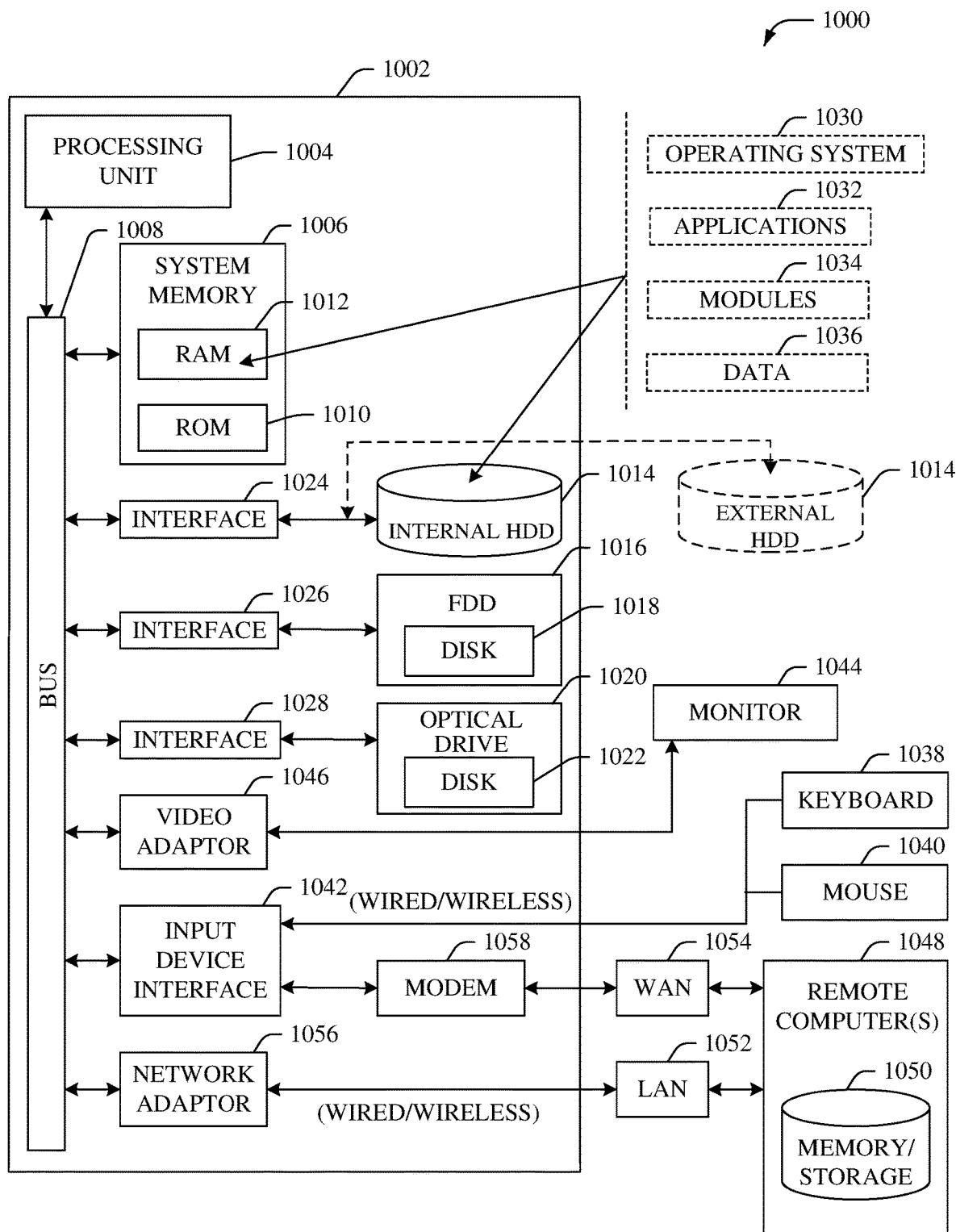
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), module(s) interface(s), gateway(s), controller(s), node(s), entity(ies), function(s), cloud(s), point(s), and/or device(s) (e.g., I-GW 102, end point(s) 104, application server(s) 106, IoT device 202, RAN AP 302, HSS 306, translation component 402, SDN controller 404, SE 408, network connectivity component 504, application instantiation component 506, AI component 602, etc.) disclosed herein with respect to systems 100-600 can each comprise at least a portion of the computer 1002. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
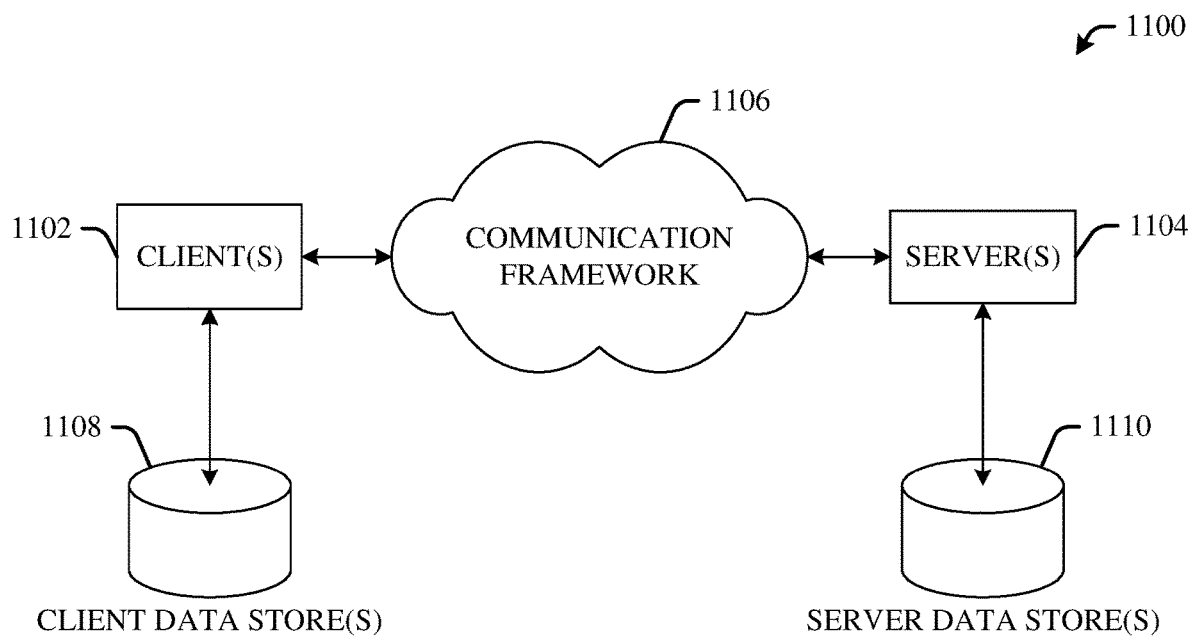
FIG. 11 illustrates a schematic block diagram of a computing environment in accordance with the subject specification

Referring now to FIG. 11, there is illustrated a schematic block diagram of a computing environment 1100 in accordance with the subject specification. The system 1100 comprises one or more client(s) 1102. The client(s) 1102 can be hardware and/or software (e.g., threads, processes, computing devices).

The system 1100 also comprises one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may comprise a cookie and/or associated contextual information, for example. The system 1100 comprises a communication framework 1106 (e.g., a global communication network such as the Internet, cellular network, etc.) that can be employed to facilitate communications between the client(s) 1102 and the server(s) 1104.

Communications can be facilitated via a wired (comprising optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A gateway device, comprising:
   a processor; and
   a memory that stores executable instructions that, when executed by the processor, facilitate performance of operations, comprising:
   receiving protocol data regarding a non-internet communication protocol supported by an Internet of things device, wherein the receiving is responsive to detection of the Internet of things device being located within a premise within which the gateway device is located, and wherein the Internet of things device does not comprise an internet protocol stack;
   receiving, via the non-internet communication protocol, a communication request from the Internet of things device directed to a device;
   in response to determining the device is remote from the premise, communicating, with network equipment that is part of a mobility network, to receive an authentication for the communication request based on an identifier for a subscriber identity module of the gateway device; and
   in response to receiving the authentication from the network equipment, facilitating a communication between the Internet of things device and the device using the non-internet communication protocol and an internet communication protocol supported by the device.

2. The gateway device of claim 1, wherein the facilitating comprises translating non-internet protocol data packets, received from the Internet of things device, to internet protocol data packets that are to be transmitted to the device via the network equipment.

3. The gateway device of claim 2, wherein the translating comprises translating the non-internet protocol data packets to the internet protocol data packets based on pool information relating to the internet protocol address pool received from the network equipment.

4. The gateway device of claim 1, wherein the facilitating comprises facilitating the communication based on user preference data received from a data store via the mobility network.

5. The gateway device of claim 1, wherein the facilitating comprises facilitating the communication based on policy data received from a data store via the mobility network.

6. The gateway device of claim 1, wherein the facilitating the communication comprises facilitating the communication based on priority data indicative of a priority assigned to the Internet of things device, and wherein the priority data is received from a data store via the mobility network.

7. The gateway device of claim 1, wherein the communication enables creation of a service across different vertical applications.

8. The gateway device of claim 1, wherein the communication is associated with a service level that has been determined based on an analysis of user preference data.

9. The gateway device of claim 1, wherein the gateway device comprises a data store, and wherein the operations further comprise:
   storing the protocol data in the data store of the gateway device.

10. The gateway device of claim 1, wherein the gateway device comprises a data store, and wherein the operations further comprise:
    storing, within the data store of the gateway device, device information associated with the Internet of things device.

11. The gateway device of claim 10, wherein the device information is indicative of a capability of the Internet of things device.

12. The gateway device of claim 1, wherein the operations further comprise:
  in response to receiving the authentication, facilitating further communication between the Internet of things device and the device using the non-internet communication protocol, a text messaging protocol, and a phone number associated with the premise.

13. A method, comprising:
  receiving, by a gateway device comprising a processor, a request from an Internet of Things device located within a premise shared with the gateway device to communicate with a device located remote from the premise, wherein receiving the request comprises receiving the request via a non-internet communication protocol supported by an Internet of things device, and wherein the Internet of things device operates without an internet protocol stack;
  in response to receiving the request, communicating, by the gateway device, with network equipment associated with a mobility network to receive an authentication for the request based on an identifier of a subscriber identity module of the gateway device; and
  based on receiving the authentication, facilitating, by the gateway device, a communication between the Internet of things device and the device using the non-internet communication protocol and an internet communication protocol supported by the device.

14. The method of claim 13, wherein the facilitating comprises mapping non-internet protocol data packets received from the Internet of Things device to internet protocol data packets that are to be transmitted to the device in accordance with the internet communication protocol.

15. The method of claim 14, wherein the mapping comprises using internet protocol address pool information received from the network equipment.

16. The method of claim 13, wherein the facilitating comprises facilitating the communication based on user preference data received from a data store via the mobility network.

17. The method of claim 13, wherein the facilitating comprises facilitating the communication based on priority data received from a data store via the mobility network.

18. The method of claim 13, wherein the facilitating comprises facilitating the communication based on security data received from a data store via the mobility network.

19. A non-transitory machine-readable medium, comprising executable instructions that, when executed by a processor of gateway equipment, facilitate performance of operations, comprising:
  receiving a request from an Internet of Things device located within a premise comprising the gateway equipment to communicate with a device located remote from the premise, wherein receiving the request comprises receiving the request via a non-internet communication protocol supported by an Internet of things device, wherein the Internet of things device communicates without an internet protocol address;
  in response to receiving the request, communicating with cellular network equipment to receive an authentication for the request based on information associated with a subscriber identity module of the gateway equipment; and
  based on receiving the authentication, facilitating a communication between the Internet of things device and the device using the non-internet communication protocol and an internet communication protocol supported by the device.

20. The non-transitory machine-readable medium of claim 19, wherein the operations further comprise:
  in response to receiving the authentication, facilitating further communication between the Internet of things device and the device using the non-internet communication protocol, a text messaging protocol, and a phone number associated with the premise.

* * * * *